(12) United States Patent
Myers et al.

(10) Patent No.: US 6,931,032 B2
(45) Date of Patent: Aug. 16, 2005

(54) METHOD OF TRANSFERRING ENERGY IN AN OPTICAL FIBER LASER STRUCTURE USING ENERGY MIGRATION

(75) Inventors: John D. Myers, Hilton Head, SC (US); Michael J. Myers, Hilton Head, SC (US)

(73) Assignee: Kigre, Inc., Hilton Head, SC (US)

( * ) Notice: Subject to any disclaimer, the term of this patent is extended or adjusted under 35 U.S.C. 154(b) by 190 days.

(21) Appl. No.: 10/398,150

(22) PCT Filed: Dec. 7, 2001

(86) PCT No.: PCT/US01/47503

§ 371 (c)(1),
(2), (4) Date: Jul. 31, 2003

(87) PCT Pub. No.: WO02/47219

PCT Pub. Date: Jun. 13, 2002

(65) Prior Publication Data

US 2004/0131091 A1 Jul. 8, 2004

Related U.S. Application Data

(60) Provisional application No. 60/251,997, filed on Dec. 17, 2000.

(51) Int. Cl.[7] .............................................. H01S 3/30
(52) U.S. Cl. .......................................... 372/6; 359/341
(58) Field of Search ............................. 372/6, 41, 108, 372/10, 11; 385/123, 126; 359/341

(56) References Cited

U.S. PATENT DOCUMENTS

| | | | |
|---|---|---|---|
| 5,291,501 A | 3/1994 | Hanna | 372/6 |
| 5,530,709 A * | 6/1996 | Waarts et al. | 372/6 |
| 5,530,710 A | 6/1996 | Grubb | 372/6 |
| 5,877,890 A * | 3/1999 | Snitzer | 359/337.5 |
| 5,937,134 A | 8/1999 | DiGiovanni | 385/142 |
| 5,966,491 A * | 10/1999 | DiGiovanni | 385/127 |
| 6,538,807 B2 * | 3/2003 | Kakui et al. | 359/341.5 |

* cited by examiner

Primary Examiner—Minsun Oh Harvey
Assistant Examiner—Tuan N. Nguyen
(74) Attorney, Agent, or Firm—Howard & Howard

(57) ABSTRACT

A method of transferring energy in an optical fiber structure is disclosed. This method transfers energy from a cladding element of the fiber structure to a core element of the fiber structure. The core element includes an active gain component and an energy migration component. The cladding element, which surrounds the core element, includes the energy migration component. The structure and method can be utilized to provide either an optical fiber laser or an optical fiber amplifier. The method includes the steps of providing a pump for producing the energy and optically coupling the pump with the cladding element. The cladding element, including the energy migration component, is then pumped with the energy produced by the pump such that the energy is absorbed and stored in the cladding element by the energy migration component. The method further includes the step of transferring the energy stored in the cladding element to the core element by migration of the energy within the energy migration component to the active gain component such that the active gain component in the core element lases or provides gain.

34 Claims, 1 Drawing Sheet

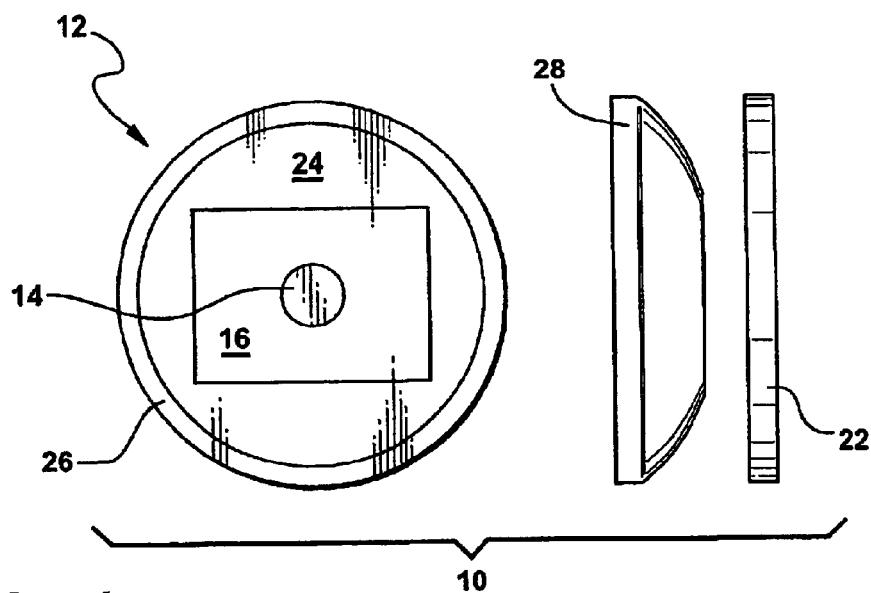
FIG - 1
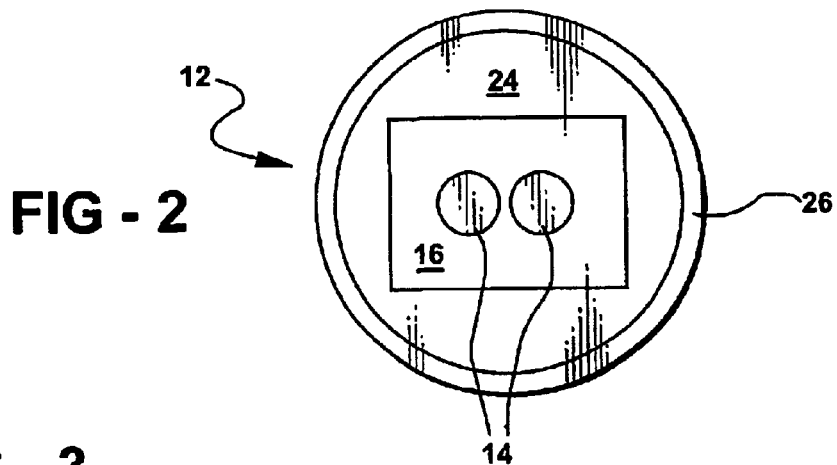
FIG - 2
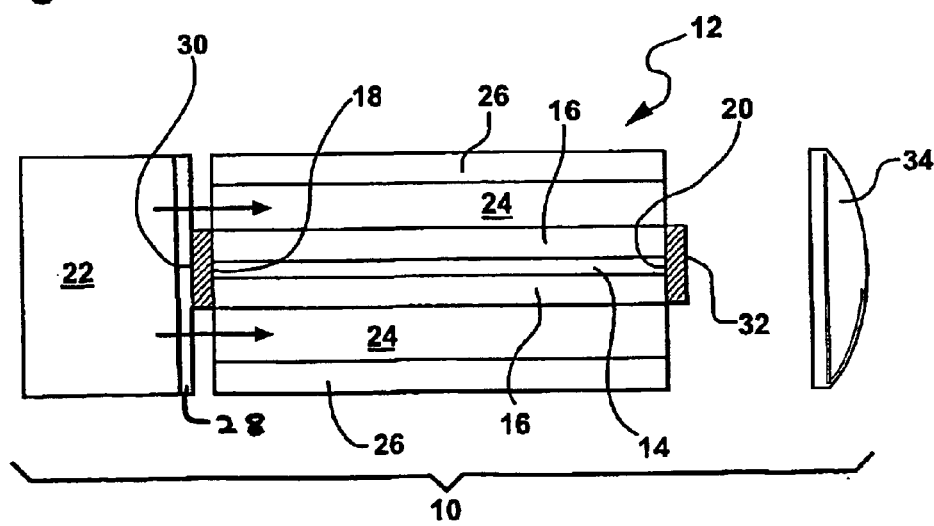

METHOD OF TRANSFERRING ENERGY IN AN OPTICAL FIBER LASER STRUCTURE USING ENERGY MIGRATION

This application claims the benefit of Provisional Application No. 60/251,997, filed Dec. 7, 2000.

BACKGROUND OF THE INVENTION

1) Field of the Invention

The subject invention generally relates to a method of transferring energy in an optical fiber amplifier or laser structure. More specifically, the subject invention relates to a method of transferring energy from a cladding element to a core element by migration of the energy within an energy migration component found in the cladding and core elements to an active gain component in the core element. In some embodiments the core element includes a sensitizer in addition to the energy migration component and the active gain component. In other embodiments, the energy migration component located in the core elements functions as the active gain component.

2) Description of Related Art

Methods of transferring energy in optical fiber amplifiers and laser structures are known in the art. To transfer energy, many of these methods rely on pumping the cladding elements of the optical fiber amplifier or laser structures. As is known in the art an optical fiber laser is basically an amplifier with feedback. Cladding-pumped optical fiber laser structures are utilized throughout the medical and telecommunication industries. More specifically, cladding-pumped optical fiber laser structures and systems have advanced the state-of-the-art in these industries by permitting pumping of single-mode core elements with multi-mode high power pumping sources. As a result, optical fiber laser structures can be developed with power densities that are only limited by material considerations and the ability to introduce energy, through the pumping sources, into the optical fiber laser structure.

One example of a method that relies on pumping the cladding element of the optical fiber laser structure is disclosed in U.S. Pat. No. 5,291,501. This method, and other conventional methods of pumping the cladding element, are deficient for various reasons. The method disclosed in the '501 patent is deficient because, to effectively transfer energy from the pumping source to the core element, this method requires pumping of an active gain component in the cladding element, specifically Nd, such that the active gain component in the cladding element actually lases. If lasing is not achieved in the cladding element, then the energy is not effectively transferred from the pumping source to the core element, i.e., the core element does not lase. Reliance on lasing to transfer energy from the cladding element to the core element creates a range of difficulties in utilizing this technology.

The method of pumping the cladding element of the optical fiber laser structure disclosed in U.S. Pat. No. 5,530,710 is deficient for similar reasons. Like the '501 patent, the method disclosed in the '710 patent utilizes an intermediate four-level active gain component to convert the energy from the pumping source into energy that is suitable for pumping a three-level active gain component. This method is, therefore, unable to directly pump a three-level active gain component without relying on first pumping of the intermediate four level active gain component.

Due to the deficiencies in the prior art methods for transferring energy from a cladding element to a core element in cladding-pumped optical fiber structures, including those identified above, it is desirable to implement a method of transferring energy in an optical fiber amplifier or laser structure that uses migration of the energy from an energy migration component in a cladding element to an active gain component in a core element such that the active gain component lases or provides amplification gain.

SUMMARY OF THE INVENTION AND ADVANTAGES

A method of transferring energy in an optical fiber structure is disclosed. Throughout the specification and claims the structure will be called an optical fiber with the understanding that it can be used for a laser or an amplifier. The optical fiber structure includes a core element and a cladding element at least partially surrounding the core element. The core element includes an active gain component and an energy migration component and the cladding element includes the same energy migration component. The method transfers energy from the energy migration component to the active gain component of the core element. In one embodiment of the invention, the energy migration component in the core is also the active gain component. In another embodiment the core element further includes a sensitizing component in addition to the energy migration component and the active gain component. In that embodiment the energy is transferred from the energy migration component in the cladding element to the energy migration component in the core element, to the sensitizing component and then to the active gain component.

The method includes the steps of providing a pumping source for producing the energy and optically coupling the pumping source with the cladding element that includes the energy migration component. The method further includes the step of pumping the cladding element with the energy produced by the pumping source such that the energy is absorbed and stored in the cladding element by the energy migration component. The energy absorbed and stored in the cladding element is then transferred to the energy migration component in the core element by migration of the energy within the energy migration component. Then the energy is transferred from the energy migration component in the core element to the active gain component such that the active gain component lases or provides amplification gain.

Accordingly, the subject invention provides a method of transferring energy in an optical fiber structure having a core element and a cladding element wherein the method uses migration to transfer the energy from an energy migration component in the cladding element to the same energy migration component in the core and then to an active gain component in the core element such that the active gain component lases or amplifies the input signal.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross-sectional view of an optical fiber laser system, used in the method of the subject invention, including an optical fiber laser structure in combination with a pumping source and a lens;

FIG. 2 is a cross-sectional view of the optical fiber laser structure including more than one core element; and FIG. 3 is a partially cross-sectional side view of the optical fiber laser system.

DETAILED DESCRIPTION OF A PREFERRED EMBODIMENT

A method of transferring energy is disclosed. More specifically, with reference to the Figures, wherein like numerals indicate like or corresponding parts throughout the several views, the method of the subject invention transfers energy in an optical fiber structure. The optical fiber structure will be described as a component of an optical fiber laser system 10 and is generally shown at 12 throughout the Figures. It is to be understood that FIGS. 1 through 3, disclosing the optical fiber laser system 10 and the optical fiber laser structure 12 of the subject invention, are not necessarily to scale.

The optical fiber laser system 10 may be referred to hereinafter as "the system" and the optical fiber laser structure 12 may be referred to hereinafter as "the structure." The structure 12 includes a core element 14 and a cladding element 16. The method of the subject invention transfers the energy from the cladding element 16 to the core element 14. The cladding element 16, which is described in more detail below, is much larger than the core element 14. The cladding element 16 may have a diameter of from 30 to 2000 microns, preferably from 100 to 500 microns. As disclosed in FIG. 2, the structure 12 preferably includes more than one core element 14. The more than one core element 14, specifically first and second core elements, as disclosed, but not numbered in FIG. 2, are disposed side-by-side within the cladding element 16. Of course, it is to be understood that there can be more than two core elements 14. The core element 14 and the cladding element 16 both comprise a matrix material in addition to the energy migration component and/or the active gain component. Suitable matrix materials include glasses or crystals. The matrix material is either doped with the energy migration component or with the energy migration component and the active gain component as is known in the art. For example, the core element 14 and the cladding element 16 may include as the matrix material a phosphate-based glass, a silicate-based glass, a germanate-based glass, or a tellurate-based glass. Suitable matrix materials also include crystals such as the well-known YLF, Yb:YAG and YCOB crystals. The core element 14 has a first second 20 end. As shown in the Figures, the first end 18 of the core element 14 is a left end, and the second end 20 of the core element 14 is a right end. Of course, it is to be understood that the core element 14 may be otherwise oriented.

The core element 14 includes an energy migration component and an active gain component. The active gain component is for lasing at a desired wavelength or for amplification. The active gain component is also known in the art as a lasing ion or as a rare earth dopant. As understood by those skilled in the art, the desired laser wavelength varies based on the particular active gain component that is utilized. The active gain component in the core element 14 is present in an amount from 0.01 to 10.0, preferably from 0.1 to 5.0, parts by weight based on 100 parts by weight of the core element 14. The energy migration component is preferably present in an amount from 5.0 to 50.0 parts by weight based on 100 parts by weight of core element, more preferably in an amount of from 10 to 40 parts by weight, and most preferably 12 to 30 parts by weight. In preferred embodiments of the subject invention, the core element 14 is further defined as a single-mode core element 14. Preferably, the single-mode core element 14 has a diameter of from 3 to 30, more preferably from 5 to 15, microns. In alternative embodiments of the subject invention the core element 14 may be further defined as a multi-mode core element. In these alternative embodiments, the multi-mode core element has a diameter of from 30 to 500, more preferably from 100 to 150, microns.

In a first embodiment of the subject invention, the active gain component in the core element 14 is ytterbium (Yb) for lasing or for providing gain. In this particular embodiment, the Yb in the core element 14 is present in an amount from 0.01 to 15.0, preferably from 0.1 to 5, parts by weight based on 100 parts by weight of the core element 14. In a second embodiment of the subject invention, the active gain component in the core element 14 includes erbium (Er) with the energy migration component ytterbium (Yb). In this particular embodiment, the Er in the core element 14 is present in an amount from 0.01 to 10.0, preferably from 0.01 to 6.0, parts by weight based on 100 parts by weight of the core element 14. In other embodiments the core element 14 also includes a sensitizing component in addition to the energy migration component and the active gain component. The sensitizing component is described in greater detail below. In a fourth embodiment of the subject invention, the active gain component in the core element 14 includes holmium (Ho). The fourth embodiment will be described below relative to certain characteristics of the cladding element 16. In a fifth embodiment of the subject invention, the active gain component in the core element 14 comprises praseodymium (Pr), neodymium (Nd), Ho, and combinations thereof. Like the fourth embodiment, the fifth embodiment will also be described below relative to certain characteristics of the cladding element 16.

It is to be understood that reference to the active gain components, as set forth above, includes the recognized ions of these elements. For instance, reference to Yb includes $Yb^{3+}$, reference to Er includes $Er^{3+}$, and so on. It is also to be understood that the amount, i.e., the concentration, of the active gain component in the core element 14 as well as the particular dimensions of the core element 14 can be controlled such that a net gain is realized along the core element 14 with respect to a coupling efficiency of the structure 12.

The cladding element 16 at least partially, and preferably completely, surrounds the core element 14. Furthermore, the cladding element 16 has a length defined between the first and second ends 18, 20 of the core element 14. The method includes the step of providing a pumping source 22. The cladding element 16 includes an energy migration component that absorbs and stores energy from the pumping source 22 that is provided according to the subject method. The method of the subject invention includes the step of transferring the energy stored in the cladding element 16 to the core element 14 by migration of the energy from the energy migration component in the cladding element 16 to the energy migration component in the core element and then to active gain component in the core element 14 such that the active gain component lases or provides gain. That is, the energy migration component enables the energy from the pumping source 22 to migrate from the energy migration component in the cladding element 16 to the active gain component in the core element 14 such that the active gain component in the core element 14 lases or provides gain. The useful energy migration components are species wherein the energy transfer rate between adjacent atoms is very fast compared to the fluorescence life of the atom. For example, the inventors have found that the energy transfer rate between Yb atoms is on the order of 4 microns per microsecond, whereas the fluorescence lifetime is approximately 2 milliseconds. Thus, Yb can rapidly transfer pumped energy from the cladding element 16 into the core element 14. Importantly, the energy stored in the cladding element 16 is transferred to the core element 14, by migration, without requiring lasing in the cladding element 16. The energy migration component in the cladding element 16 is present in an amount from 5 to 50, preferably from 10 to 30, parts by weight based on 100 parts by weight of the cladding element 16. The concentration of the energy migration component in the cladding element 16 is sufficiently high, e.g. from 10 to 30 parts, such that the threshold for lasing or for providing gain is never achieved in the cladding element 16. Preferably, the energy migration component is present at the same levels in both the cladding element and the core element.

The method includes the step of optically coupling the pumping source 22 that is provided with the cladding element 16 to provide the energy to the cladding element 16 for migration of the energy to the core element 14. The pumping source 22 pumps the cladding element 16, including the energy migration component, with the energy produced by the pumping source 22 such that the energy is absorbed and stored in the cladding element 16 by the energy migration component. The energy provided by the pumping source 22 to the cladding element 16 is indicated by the arrows in FIG. 3. FIG. 3 represents an end-pumped configuration as is understood in the art. A second configuration, which is more preferred relative to the end-pumped configuration, is a side-pumped configuration where the pumping source 22 is a line-source and is optimally suited for pumping the optical fiber laser structure 12. Preferably, the pumping source 22 that is provided is further defined as a laser diode or a laser diode array or a laser diode bar. Alternatively, the pumping source 22 that is provided is further defined as a flashlamp. Other pumping sources 22 suitable for providing the energy to the cladding element 16 include, but are not limited to, thermal blackbodies, nuclear radiation, and the like.

In the first embodiment, where the active gain component in the core element 14 is Yb, the energy migration component in the cladding element 16 preferably is Yb. In this embodiment, the Yb in the cladding element 16 is present in an amount from 5 to 50, preferably from 10 to 40, and most preferably from 12 to 30, parts by weight based on 100 parts by weight of the cladding element 16. In this embodiment, the concentration of Yb in the core element 14 is significantly lower than the concentration of Yb in the cladding element 16 to lower the threshold for lasing or for providing gain in the core element 14. Thus, the energy is pumped into the cladding Yb element 16 wherein the high level of Yb transfers the energy to the core element 14. The low level of Yb in the core element 14, relative to the level in the cladding element 16 causes the Yb in the core element 14 to lase. Thus, in this embodiment the energy migration component and the active gain component are the same species.

In the second embodiment, where the active gain component in the core element 14 is Er, the energy migration component in the cladding and core elements 16, 14 preferably includes Yb. In this embodiment, the Yb in the cladding and core elements 16, 14 is present in an amount from 5 to 50, preferably from 10 to 40, and most preferably from 12 to 30, parts by weight based on 100 parts by weight of the cladding element 16 or the core element 14, respectively. In this embodiment, where Er functions as the active gain component and Yb functions as the energy migration component, the subject invention incorporates an energy migration component and an active gain component that are different species. Using Yb in the core element 14 and the cladding element 16 permits the energy to continue to migrate throughout an entire volume of the core element 14 and, at the same time, act as the sensitizing component to the Er. Using Yb as the sensitizing component in this embodiment is described further below.

In the fourth embodiment, where the active gain component in the core element 14 includes Ho, the energy migration component in the core and cladding elements 14, 16 preferably includes ytterbium (Yb). In this embodiment, the Yb in the cladding element 16 and in the core element 14 is present in an amount from 5 to 50, preferably from 10 to 30, and most preferably from 15 to 25, parts by weight based on 100 parts by weight of the cladding element 16 and core element 14. Furthermore, in this embodiment, where Ho functions as the active gain component and Yb functions as the energy migration component, the subject invention further incorporates Tm in the core element 14 as a sensitizing component to the Ho. Using Tm as the sensitizing component in this embodiment is described further below.

In further alternative embodiments, the energy migration component in the cladding element 16 can comprise europium (Eu), terbium (Tb), cerium (Ce), and combinations thereof.

The cladding element 16 has a cross-sectional shape that is suitable for the energy from the pumping source 22 to efficiently migrate from the energy migration component in the cladding element 16 to the active gain component in the core element 14. Therefore, although shown as rectangular, the cross-sectional shape of the cladding element 16 can be of any shape so long as the shape affords efficient absorption of pump radiation from the pumping source 22 in either the end-pumped or the side-pumped configuration. The efficient absorption of pump radiation must be balanced with a minimization of a volume of the cladding element 16 to keep energy storage requirements as low as possible.

It is to be understood that the shape, and even the size, of the cladding element 16 influences the energy that migrates from the cladding element 16 to the core element 14. The cross-sectional shape of the cladding element 16 is at least one of a polygonal shape and a circular shape. The polygonal-shaped cross-section of the cladding element 16 includes a rectangular-shaped cross-sectional shape, such as a square, and the circular-shaped cross-section of the cladding element 16 includes an oval-shaped cross-sectional shape. In the most preferred embodiment, the cross-sectional shape of the cladding element 16 is the rectangular-shaped cross-sectional shape. However, it is to be understood that the subject invention is not limited to this most preferred embodiment.

If present, the sensitizing component in the core element 14 absorbs the energy from the energy migration component in the core element 14 and transfers this energy to the active gain component. Therefore, in embodiments of the subject invention where the sensitizing component is present, the energy migration component relies on the sensitizing component to enable migration of the energy to the active gain component in the core element 14. That is, the energy is transferred from the energy migration component through the sensitizing component and to the active gain component.

If present, the sensitizing component is preferably identical to, i.e., is of the same ionic species as, the energy migration component such that then energy can migrate directly from the energy migration component in the cladding element 16 to the active gain component in the core element 14. In some embodiments, such as when Ho is the active gain component in the core element 14, Tm may be used in the core element 14 as a sensitizing component while Yb is the energy migration component. In the second embodiment, where Er functions as the active gain component and Yb functions as the energy migration component, Yb also acts in the core element 14 as the sensitizing component to the Er. In this embodiment, the Yb both absorbs the energy and transfers this energy to the Er active gain component such that the Er active gain component lases. For the Yb sensitizing component to efficiently absorb and transfer energy, the Yb sensitizing component is generally present in the core element 14 in an amount that is roughly equivalent to the amount of Yb present in the cladding element 16. More specifically, the Yb sensitizing component in the core element 14 is present in an amount from 5 to 50, preferably from 10 to 40, and most preferably from 12 to 30, parts by weight based on 100 parts by weight of the core element 14. In this embodiment, the Yb is simply an extension of the Yb in the cladding element 16 as the energy migration component. The Yb in the core element 14 transfers the energy to the Er active gain component such that the Er active gain component lases or provides gain.

In the fourth embodiment, where Ho functions as the active gain component and Yb functions as the energy migration component, Tm is incorporated into the core element 14 as the sensitizing component to the Ho. In this embodiment, the Tm sensitizing component absorbs the energy from the Yb energy migration component and transfers this energy to the Ho active gain component such that the Ho active gain component lases.

In the fifth embodiment, where the active gain component in the core element 14 comprises Pr, Nd, Ho, and combinations thereof, the core element 14 preferably further comprises a sensitizing component in addition to the energy migration component to transfer the migrating energy to the particular active gain component. In this embodiment, the sensitizing component is preferably Tm, for absorbing the energy from the energy migration component and transferring the energy to the active gain component.

The structure 12 preferably further includes an outer cladding element 24 that surrounds the inner cladding element 16. The structure 12 also preferably includes a protective coating 26 surrounding the outer cladding element 24. Suitable protective coatings 26 include, but are not limited to, silicone-based coatings, fluoropolymer-based coatings, or even low index glasses. The preferred embodiment of the structure 12 further includes a heat sink, not shown. The heat sink, when present, is around the inner cladding element 16, and is thermally coupled to the cladding element 16 for dissipating any heat generated in the optical fiber laser structure 12.

The core element 14, the cladding element 16, and the outer cladding element 24 each have an index of refraction, $n_1$, $n_2$, $n_3$, respectively. The index of refraction $n_1$, of the core element 14 is greater than the index of refraction $n_2$ of the cladding element 16. In preferred embodiments of the subject invention, the index of refraction $n_1$ of the core element 14 is greater than the index of refraction $n_2$ of the cladding element 16 by about 0.01, or by any desired amount necessary to establish an appropriate numerical aperture. The difference in the index of refraction $n_1$, of the core element 14 to the index of refraction $n_2$ of the cladding element 16 as indicated above determines a mode value of the core element 14. Also, the index of refraction $n_2$ of the cladding element 16 may be equal to, or greater than that of the index of refraction $n_3$ of the outer cladding element 24 as befits pumping dynamics. In preferred embodiments of the subject invention, the index of refraction $n_2$ of the cladding element 16 is greater than the index of refraction $n_3$ of the outer cladding element 24 by about 0.01. The difference in the index of refraction $n_2$ of the cladding element 16 to the index of refraction $n_3$ of the outer cladding element 24, as indicated above, determines an angle at which energy can be pumped into the structure 12 by the pumping source 22. In sum, a relationship of the index of refraction $n_1$, of the core element 14 to the index of refraction $n_2$ of the cladding element 16 to the index of refraction $n_3$ of the outer cladding element 24 is preferably $n_1 > n_2 > n_3$. The relationship set forth above, where the index of refraction decreases from the core element 14 outward to the outer cladding element 24 determines a numerical aperture or an angle at which energy emerges from the various elements of the structure 12. The numerical apertures of both the core element 14 and the cladding element 16 is from 0 to about 0.9.

In combination with the pumping source 22 set forth above, the optical fiber laser structure 12 establishes the optical fiber laser system 10 of the subject invention. As shown in FIG. 1, the system 10 further includes a lens 28 optically coupling the pumping source 22 to the cladding element 16. The lens 28 in FIG. 1 is disposed in a position between the outer cladding element 24 of the structure 12 and the pumping source 22. In this position, the lens 28 converges the energy provided by the pumping source 22 onto the cladding element 16. As a result of the inclusion of the lens 28, the cladding element 16 of the structure 12 can either be side-pumped or end-pumped. Side-pumping of the structure 12 of the subject invention is also ideal because the cladding element 16 is optically dense to the energy, or radiation, provided from the pumping source 22 thereby enabling the energy to be distributed along the length of the cladding element 16.

Referring to FIG. 3, the system 10 is disclosed as a laser. In this embodiment, the system 10 further includes first 30 and second 32 reflectors. As understood by those skilled in the art, when the system 10 is not a laser, but an amplifier, then the first 30 and second 32 reflectors are absent. The first reflector 30 is disposed at the first end 18 of the core element 14, and the second reflector 32 is disposed at the second end 20 of the core element 14. It is to be understood that the first and second reflectors 30, 32 may include, but are not limited to, a coating, or a mirror. Preferably, the first and second reflectors 30, 32 are mirrors. In the most preferred embodiment of the subject invention, the second reflector 32 is different from the first reflector 30. In the second embodiment, for example, where the core element 14 includes Er for lasing, the second reflector 32 is different from the first reflector 30 in that the first reflector 30 is highly reflective at about 1054 nm and the second reflector 32 is partially reflective at about 1054 nm, which is the center of the lasing bandwidth of Er. Because of the partial transparency of the second reflector 32, the structure 12 and system 10 according to the subject invention lase, or provide laser activity, at a preferred laser wavelength of from 1500 to 1600 nanometers (nm).

The energy absorbed and stored from the pumping source 22 migrates from the energy migration component to the active gain component as a result of resonant electric dipole-dipole interactions. The energy migrates between adjacent ions of common species at a particular energy transfer rate. In the first embodiment, for example, the energy migrates from Yb site to Yb site and eventually, through migration, transfers from the energy migration component in cladding element 16, which is being pumped by the pumping source 22, to the active gain component in the core element 14. At this point, the Yb active gain component lases because it is at a sufficiently low concentration, relative to the higher concentration of the Yb energy migration component in the cladding element 16. In the second embodiment, for example, the energy also migrates from Yb site to Yb site. However, in this embodiment, once the energy migrates to the sites of Yb in the core element, the Yb, functioning as the sensitizing component, transfers this energy to Er, the active gain component. At this point, the Er active gain component lases because it is at a sufficiently low concentration, relative to the higher concentration of the Yb energy migration component in the cladding element 16 and relative to the higher concentration of the Yb sensitizing component in the core element 14.

By relying on energy migration, there is no requirement in the subject invention that the energy migration component in the cladding element 16, or any other component in the cladding element 16, lase, i.e., achieve stimulated emission. As a result, the system 10 does not need an intervening four-level active gain component between the pumping source 22 and the active gain component in the core element 14.

In a first example of the subject invention, which is representative of the first embodiment, 20 parts by weight of Yb were added to the cladding element 16 based on 100 parts by weight of the cladding element 16. 4 parts by weight of Yb were added to the core element 14 based on 100 parts by weight of the core element 14. The cladding element 16 had a 100-micron diameter and the core element 14 had a 10-micron diameter. A pumping source, specifically a laser diode operating between 910 and 980 nm, pumped the cladding element 16. Energy migrated from the Yb in the cladding element 16, i.e., the energy migration component, to the Yb in the core element 14, i.e., and the active gain component. Because the amount of Yb in the core element 14 is at the lower concentration, relative to the amount of Yb in the cladding element 16, the core element 14 has a lower lasing threshold and therefore lases before the cladding element 16 can achieve threshold.

In a second example of the subject invention, which is representative of the second embodiment, 20 parts by weight of Yb were added to the cladding element 16 based on 100 parts by weight of the cladding element 16. Additionally, 20 parts by weight of Yb, as the sensitizing component/energy migration component, were added to the core element 14 based on 100 parts by weight of the core element 14. As the active gain component, 2.0 parts by weight of Er were added to the core element 14 based on 100 parts by weight of the core element 14. The cladding element 16 had a 50-micron diameter and the core element 14 had a 10-micron diameter. A pumping source, specifically a laser diode operating between 910 and 980 nm, pumped the cladding element 16. Energy migrated from the Yb in the cladding element 16, i.e., the energy migration component, to the Yb in the core element 14, i.e., the sensitizing component, and to the Er in the core element 14, i.e., the active gain component, such that the core element 14 lased.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims. Furthermore, the reference numerals are merely for convenience and are not to be in any way to be read as limiting.

What is claimed is:

1. A method of transferring energy from a cladding element to a core element in an optical fiber laser structure wherein the core element comprises an active gain component that lases, said method comprising the steps of:
   a) providing a pumping source for producing energy;
   b) optically coupling the pumping source to a cladding element comprising a matrix material having an energy migration component, the cladding element at least partially surrounding a core element comprising a matrix material, the energy migration component, and an active gain component;
   c) pumping the cladding element with the energy produced by the pumping source such that the energy is absorbed and stored by the energy migration component; and
   d) transferring the energy stored in the cladding element to the core element by migration of the energy from the energy migration component in the cladding to the energy migration component within the matrix material of the core and then to the active gain component within the matrix material of the core element such that the active gain component lases.

2. The method of claim 1 wherein step a) comprises providing a laser diode for producing the energy to pump the cladding element.

3. The method of claim 1 wherein step a) comprises providing a flashlamp for producing the energy to pump the cladding element.

4. The method of claim 1 further comprising providing an active gain component in the core element that is identical to the energy migration component in the cladding element and providing the active gain component in the core element at a level below the level of the energy migration component in the cladding element so that the active gain component lases.

5. The method of claim 1 further comprising the step of providing a sensitizing component in the core element and wherein step d) further comprises transferring the energy stored in the energy migration component through the sensitizing component to the active gain component, thereby causing the active gain component to lase.

6. The method of claim 5 comprising providing a sensitizing component in the core element that is identical to the energy migration component in the cladding element.

7. The method of claim 1 wherein step b) further comprises providing a cladding element having a matrix material comprising one of a glass or a crystal.

8. The method of claim 7 wherein step b) comprises providing a cladding element having a matrix material comprising one of a phosphate-based glass, a silicate-based glass, a germanate-based glass, a tellurate-based glass, or mixtures thereof.

9. The method of claim 7 wherein step b) comprises providing a cladding element having a matrix material comprising one of a Yb:YAG crystal, a YLF crystal or a YCOB crystal.

10. The method of claim 1 wherein step b) further comprises providing a core element having a matrix material comprising one of a glass or a crystal.

11. The method of claim 10 wherein step b) comprises providing a core element having a matrix material comprising one of a phosphate-based glass, a silicate-based glass, a germanate-based glass, a tellurate-based glass, or mixtures thereof.

12. The method of claim 10 wherein step b) comprises providing a core element having a matrix material comprising one of a Yb:YAG crystal, a YLF crystal or a YCOB crystal.

13. The method of claim 1 wherein step b) comprises providing as the energy migration component one of Ytterbium, Thulium, Europium, Terbium, Cerium, or mixtures thereof.

14. The method of claim 1 wherein step d) comprises providing as the active gain component one of Ytterbium, Erbium, Holmium, Praseodymium, Neodymium, or mixtures thereof.

15. The method of claim 1 wherein step b) further comprises providing the energy migration component in the cladding and core elements at levels of from 5 to 50 parts by weight based on 100 parts by weight of the cladding element.

16. The method of claim 1 wherein step b) comprises providing the active gain component in the core element at a level of from 0.01 to 15.0 parts by weight based on 100 parts by weight of the core element.

17. The method of claim 1 wherein step b) comprises providing the active gain component in the core element at a level of from 0.1 to 10.0 parts by weight based on 100 parts by weight of the core element.

18. A method of transferring energy from a cladding element to a core element in an optical fiber amplifier structure wherein the core element comprises an active gain component that provides gain, said method comprising the steps of:
　a) providing a pumping source for producing energy;
　b) optically coupling the pumping source to a cladding element comprising a matrix material having an energy migration component, the cladding element at least partially surrounding a core element comprising a matrix material, an energy migration component, and an active gain component;
　c) pumping the cladding element with the energy produced by the pumping source such that the energy is absorbed and stored by the energy migration component; and
　d) transferring the energy stored in the cladding element to the core element by migration of the energy from the energy migration component in the cladding to the energy migration component within the matrix material of the core and then to the active gain component within the matrix material of the core element such that the active gain component provides gain.

19. The method of claim 18 wherein step a) comprises providing a laser diode for producing the energy to pump the cladding element.

20. The method of claim 18 wherein step a) comprises providing a flashlamp for producing the energy to pump the cladding element.

21. The method of claim 18 further comprising providing an active gain component in the core element that is identical to the energy migration component in the cladding element and providing the active gain component in the core element at a level below the level of the energy migration component in the cladding element so that the active gain component provides gain.

22. The method of claim 18 further comprising the step of providing a sensitizing component in the core element and wherein step d) further comprises transferring the energy stored in the energy migration component through the sensitizing component to the active gain component, thereby causing the active gain component to provide gain.

23. The method of claim 22 comprising providing a sensitizing component in the core element that is identical to the energy migration component in the cladding element.

24. The method of claim 18 wherein step b) further comprises providing a cladding element having a matrix material comprising one of a glass or a crystal.

25. The method of claim 24 wherein step b) comprises providing a cladding element having a matrix material comprising one of a phosphate-based glass, a silicate-based glass, a germanate-based glass, a tellurate-based glass, or mixtures thereof.

26. The method of claim 24 wherein step b) comprises providing a cladding element having a matrix material comprising one of a Yb:YAG crystal, a YLF crystal or a YCOB crystal.

27. The method of claim 18 wherein step b) further comprises providing a core element having a matrix material comprising one of a glass or a crystal.

28. The method of claim 27 wherein step b) comprises providing a core element having a matrix material comprising one of a phosphate-based glass, a silicate-based glass, a germanate-based glass, a tellurate-based glass, or mixtures thereof.

29. The method of claim 27 wherein step b) comprises providing a core element having a matrix material comprising one of a Yb:YAG crystal, a YLF crystal or a YCOB crystal.

30. The method of claim 18 wherein step b) comprises providing as the energy migration component one of Ytterbium, Thulium, Europium, Terbium, Cerium, or mixtures thereof.

31. The method of claim 18 wherein step d) comprises providing as the active gain component one of Ytterbium, Erbium, Holmium, Praseodymium, Neodymium, or mixtures thereof.

32. The method of claim 18 wherein step b) further comprises providing the energy migration component in the cladding and core elements at levels of from 5 to 50 parts by weight based on 100 parts by weight of the cladding and core elements.

33. The method of claim 18 wherein step b) comprises providing the active gain component in the core element at a level of from 0.01 to 15.0 parts by weight based on 100 parts by weight of the core element.

34. The method of claim 18 wherein step b) comprises providing the active gain component in the core element at a level of from 0.1 to 5.0 parts by weight based on 100 parts by weight of the core element.

* * * * *